US012654675B2

(12) United States Patent
Wolf et al.

(10) Patent No.: US 12,654,675 B2

(45) Date of Patent: *Jun. 16, 2026

(54) ELECTRIC MACHINE SPEED DEPENDENT VARIABLE FREQUENCY PULSED TORQUE CONTROL FOR ELECTRIC MACHINE

(71) Applicant: Ford Global Technologies, LLC, Dearborn, MI (US)

(72) Inventors: Chris Wolf, Ann Arbor, MI (US); Michael W. Degner, Novi, MI (US); Yue Nie, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

This patent is subject to a terminal disclaimer.

(21) Appl. No.: 18/156,244

(22) Filed: Jan. 18, 2023

(65) Prior Publication Data

US 2024/0239328 A1    Jul. 18, 2024

(51) Int. Cl.
B60W 20/10 (2016.01)
B60W 10/08 (2006.01)

(52) U.S. Cl.
CPC ............ B60W 20/10 (2013.01); B60W 10/08 (2013.01); *B60W 2510/081* (2013.01); *B60W 2710/083* (2013.01)

(58) Field of Classification Search
CPC ................ B60W 20/10; B60W 10/08; B60W 2510/081; B60W 2710/083; B60K 2001/001; B60K 2026/025; B60K 2026/046; B60L 2240/34; B60L 2240/421; B60L 2240/423; B60L 2240/461; B60L 2270/14; B60L 2270/142; B60L 2270/145; B60L 15/20; H02P 21/05; H02P 21/18; H02P 21/20; H02P 27/12

See application file for complete search history.

(56) References Cited

U.S. PATENT DOCUMENTS

| | | | |
|---|---|---|---|
| 10,259,340 B1 * | 4/2019 | Wolf | B60L 15/007 |
| 10,273,874 B2 * | 4/2019 | Santillo | F02D 9/02 |
| 10,944,352 B2 | 3/2021 | Mazda et al. | |
| 11,345,241 B1 | 5/2022 | Cai | |
| 2021/0146909 A1 * | 5/2021 | Serrano | H02P 27/16 |
| 2022/0094290 A1 | 3/2022 | Carvell | |
| 2022/0255487 A1 * | 8/2022 | Wolf | H02P 27/085 |
| 2022/0294368 A1 * | 9/2022 | Phillips | H02P 23/02 |
| 2024/0227771 A1 * | 7/2024 | Tsukagoshi | H02P 29/50 |

FOREIGN PATENT DOCUMENTS

WO        2018154733 A1     8/2018

* cited by examiner

*Primary Examiner* — Scott A Browne
*Assistant Examiner* — Lidia Kwiatkowska
(74) *Attorney, Agent, or Firm* — McCoy Russell LLP

(57) ABSTRACT

Systems and methods for commanding an electric drive system for an electric or hybrid vehicle are described. In one example, the drive system is commanded by a controller that supplies a pulsed torque command that varies in frequency as a function of electric machine speed when a driver of a vehicle requests a constant driver demand torque.

15 Claims, 10 Drawing Sheets

ELECTRIC MACHINE SPEED DEPENDENT VARIABLE FREQUENCY PULSED TORQUE CONTROL FOR ELECTRIC MACHINE

FIELD

The present description relates to methods and a system for controlling torque of an electric machine.

BACKGROUND

Losses of an electric machine may increase as torque generated by the electric machine increases. The electric machine losses may increase non-linearly as torque increases, but the electric machine losses may be greater at lower level electric machine torque output levels than may be expected due to inverter switching. Electric machines that operate in electric vehicles to provide propulsive effort may often operate at lower torque output levels. In addition, it may be desirable to convert electrical energy into propulsive force as efficiently as possible so that vehicle range may be extended and vehicle operating expenses may be lowered. Therefore, it may be desirable to provide a way of increasing electric machine efficiency when the electric machine is operating at low torque output levels.

The inventors herein have recognized the above-mentioned issues and have developed a method for operating an electric drive system, comprising: generating a pulsed torque request that varies in frequency as a function of electric machine speed in response to a constant driver demand torque request; and generating a torque that on average corresponds to the constant driver demand torque request via an electric machine in response to the pulsed torque request.

By generating a pulsed torque command or signal that varies in frequency as a function of electric machine speed, it may be possible to reduce losses of an electric drive system while maintaining a lower level of noise and vibration as compared to operating the electric drive system based on a pulsed torque command that does not vary as a function of electric machine speed in response to a constant driver demand torque request.

The present description may provide several advantages. In particular, the approach may provide smoother torque generation and lowered electric drive system losses. Further, the approach may reduce torque ripple and radial electromagnetic forces in the electric machine. Further still, the approach may be applied in different ways in different applications so that noise and vibration requirements of the different applications may be met.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
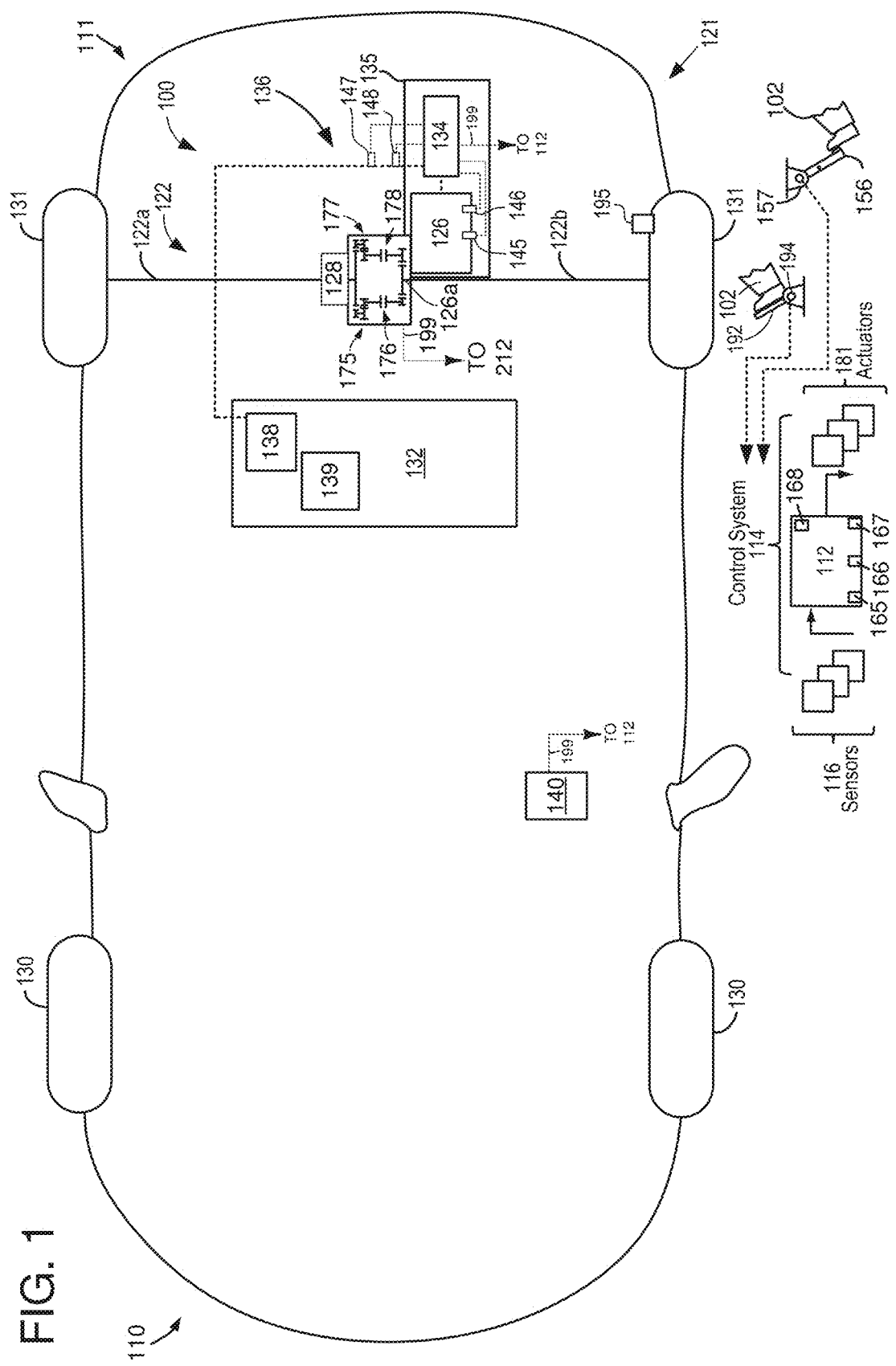
FIG. 1 is a schematic diagram of a vehicle that includes an electric machine for propulsion.
Figures 3, 4:
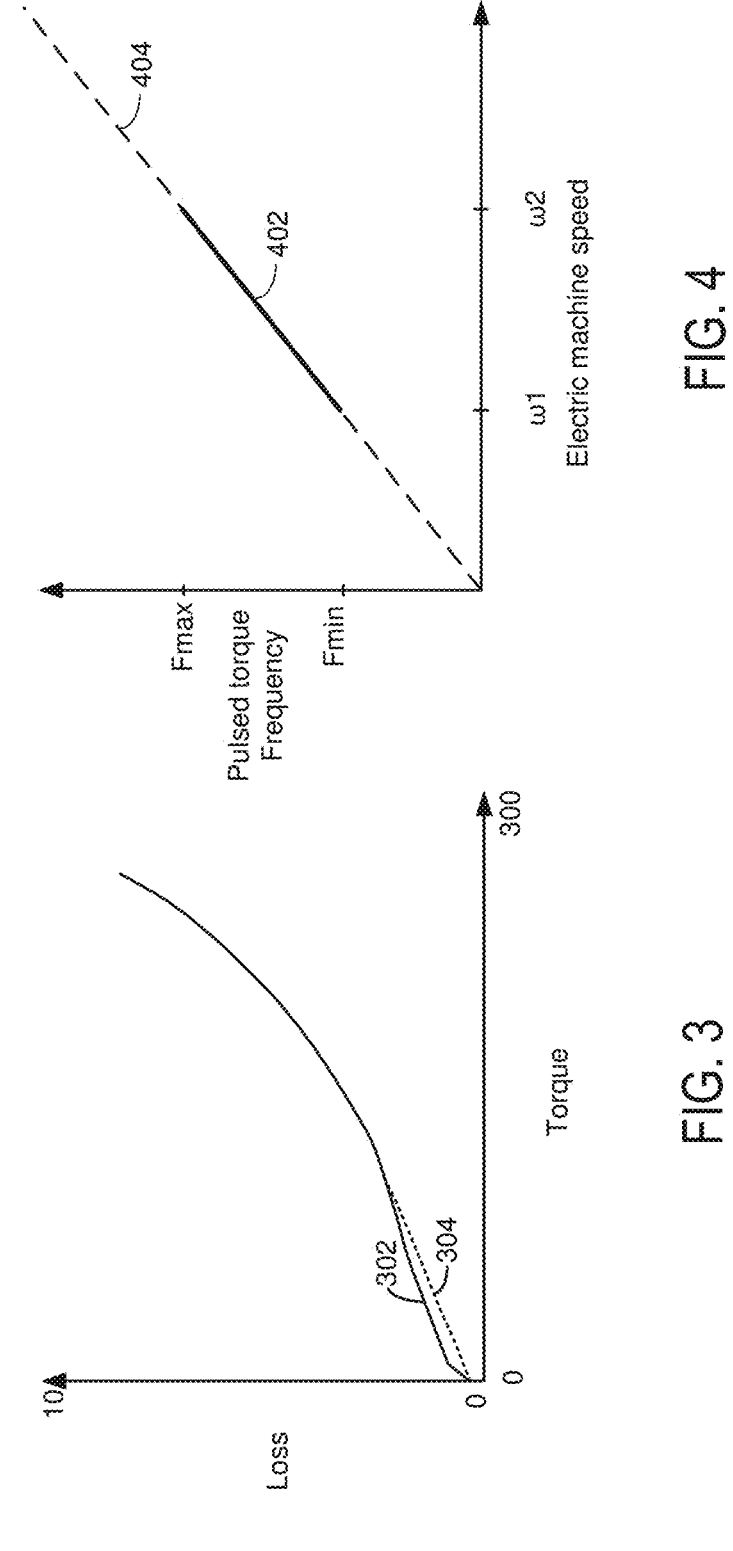
FIG. 3 is a plot that shows an electric machine operating region where losses of an electric machine may be lowered.
FIG. 4 is a plot that shows how frequencies of a pulsed torque command may be adjusted as a function of electric machine speed while torque output of an electric machine that is commanded to follow the pulsed torque command meets a driver demand torque.
Figure 15:
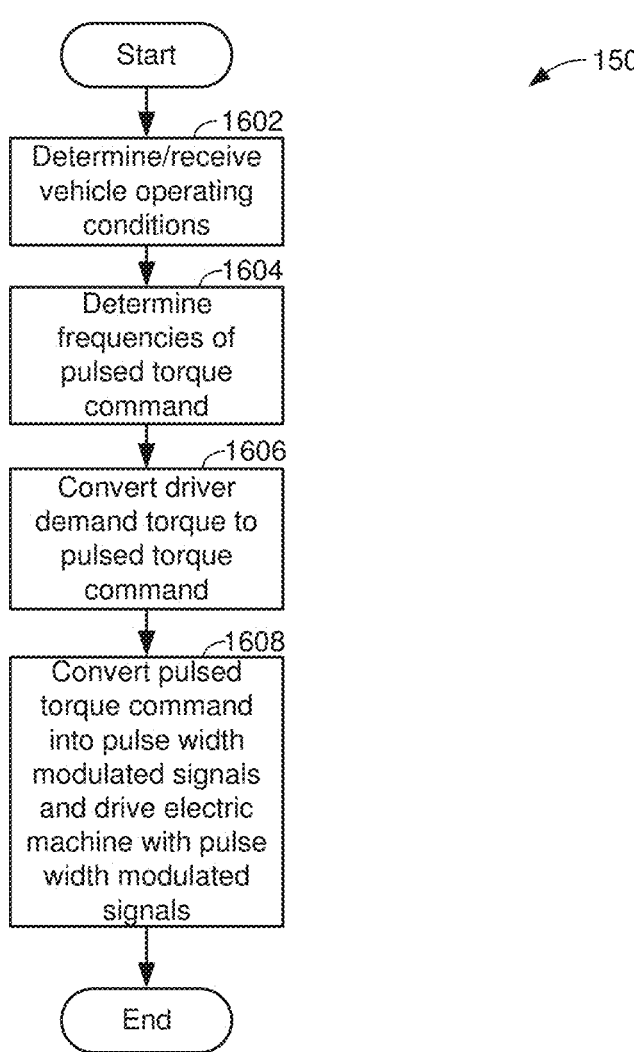
FIG. 15 shows a method for generating pulsed torque commands for operating an electric machine.
Figure 16:
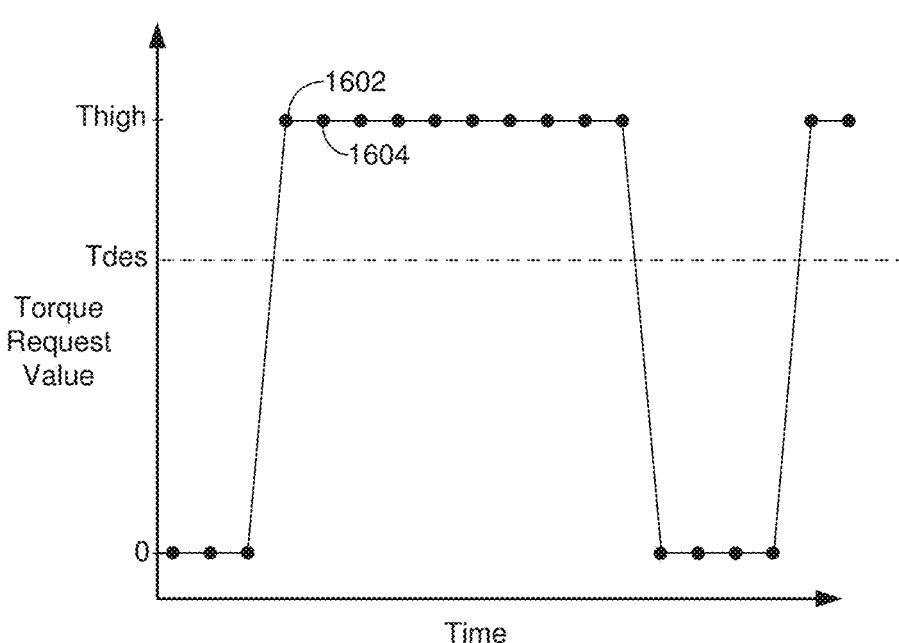
FIG. 16 shows a detailed view of a pulsed torque command.

The present description is related to improving efficiency of an electric drive system that includes an electric machine. The efficiency of the electric drive system may be improved by commanding the electric drive system via a pulsed torque command signal. The pulsed torque command signal may be output by a controller at lower driver demand torques to improve electric drive system efficiency. The pulsed torque command signal may be applied in a vehicle of the type that is shown in FIG. 1. The pulsed torque command signal may be generated via a controller and the pulse torque command may be input to an electric drive system as shown in the block diagram of FIG. 2. The pulsed torque command may be applied to the electric drive system in a low torque operating region as shown in FIG. 3. FIGS. 4-14 show how frequencies of a pulsed torque command signal may be varied according to electric machine speed while meeting driver demand torque and noise and vibration metrics. A flowchart of a method for generating a pulsed torque command signal is shown in FIG. 15. A close-up of a pulsed torque command is shown in FIG. 16.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft 122a, and second half shaft 122b. Vehicle propulsion system 100 further has front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 126a of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122a and to second half shaft 122b. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC1) 134 may convert alternating current generated by electric machine 126 to direct current for storage at the electric energy storage device 132 and vice versa. Electric drive system 135 includes electric machine 126 and inverter system controller 134. Inverter system controller may include a microcontroller, memory (e.g., random-access memory and read-only memory), and input/output circuitry (not shown). Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, energy storage device 132, inverter system controller 134, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Pedal 192 may refer schematically to a driver demand pedal. Similarly, control system 114 may receive an indication of an operator requested vehicle braking via a human operator 102, or an autonomous controller. For example, control system 114 may receive sensory feedback from brake pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134.

Thus, the system of FIG. 1 provides for a system, comprising: an electric drive system including an inverter and an electric machine; and a controller including executable instructions stored in non-transitory memory that cause the controller to generate a pulsed torque request that varies in frequency with electric machine speed randomization. In a first example, the system includes where the torque pulse request varies in frequency according to a constant width probability distribution. In a second example that may include the first example, the system includes where the torque pulse request varies in frequency according to a piece-wise random probability distribution. In a third example that may include one or both of the first and second examples, the system includes where the torque pulse request varies in frequency according to an electric machine speed dependent probability distribution. In a fourth example that may include one or more of the first through third examples, the system includes where the inverter is supplied pulse width modulated signals that are generated from the pulsed torque request. In a fifth example that may include one or more of the first through fourth examples, the system includes where the electric machine is couple to a wheel of a vehicle. In a sixth example that may include one or more of the first through fifth examples, the system includes where the frequency increases as electric machine speed increases.

Figure 2:
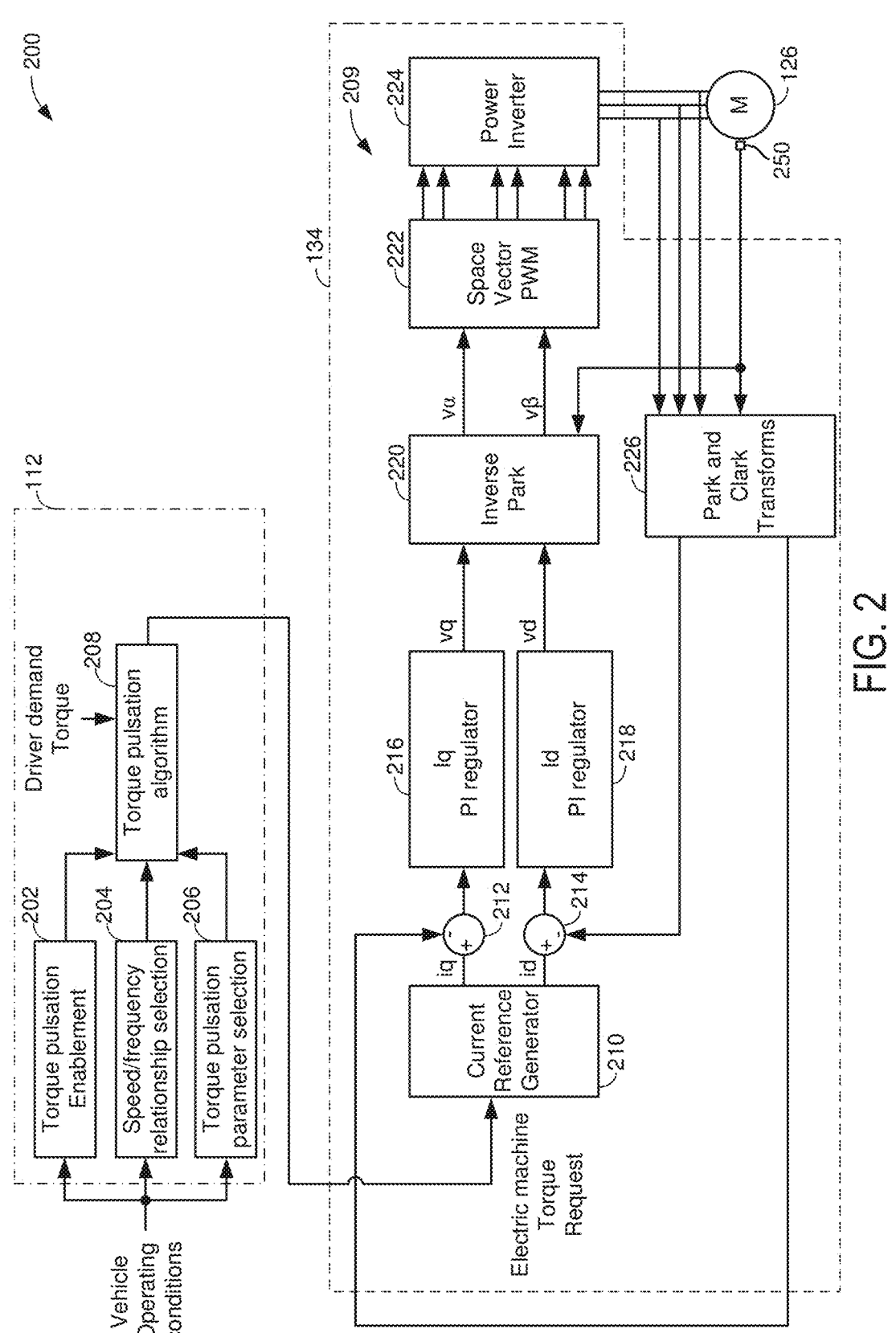
FIG. 2 is a block diagram of a controller that supplies a pulsed torque signal to an electric drive system that includes an electric machine.

Referring now to FIG. 2, a block diagram 200 of a controller 112 that supplies a pulsed torque signal to an electric drive system that includes an electric machine is shown. The controller 112 includes a torque pulsation enablement module 202, a speed/frequency relationship module 204, a torque pulsation parameter selection module 206, and a torque pulsation algorithm module 208. The torque pulsation enablement module 202, the speed/frequency relationship module 204, the torque pulsation parameter selection section 206, and the torque pulsation algorithm module 208 may be comprised of executable instructions stored in non-transitory memory of controller 112.

The torque pulsation enablement module 202 contains logic to activate and bypass the torque pulse strategy as a function of vehicle operating conditions. In one example, the torque pulse strategy may be activated when vehicle speed and driver demand torque is within a specified range (e.g., 25 RPM to 75 RPM and torque between 10 Newton-meters and 75 Newton-meters).

The speed/frequency relationship selection block includes a mapping between vehicle speed and the desired torque pulsation frequency. In one example, vehicle speed is input to a table or function of empirically determined frequency values and the table or function outputs frequencies for the pulsed torque command. The optimality of the torque pulsation frequency may be expected to vary as a function of vehicle operating point. This mapping allows for adjustment of torque pulsation frequency as a function of vehicle speed to ensure a balance of efficiency improvements and NVH performance across a wide variety of vehicle operating conditions.

The torque pulsation parameter selection module 206 includes a mapping between vehicle operating conditions (e.g., vehicle speed and driver demand torque) and torque pulsation parameters such as minimum and maximum pulsation frequencies, pulsation frequency as a function of electric machine speed, and speed dependent randomization parameters. Adjusting torque pulsation parameters according to these dependencies may allow improved optimization for balancing efficiency improvements with noise and vibration performance.

The torque pulsation algorithm module 208 modifies the driver demand torque request into a pulsed torque request or command. The pulsed torque request frequency is a function of electric machine speed. In one example, the pulsed torque request is generated via selecting a lower bound torque (e.g., zero), an upper bound torque (e.g., 100 Newton-meters), the frequency (e.g., which may be a function of electric machine speed), and the driver demand torque. A torque pulse period is determined via T=1/period, where T is the period in seconds. The percentage of the period when the torque pulse is equal to the upper bound torque may be determined via the following equation: time_high=T*(driver demand torque/upper bound torque). This equation may be modified slightly if the lower boundary torque is other than zero. The pulsed torque may then be generated by outputting a pulsed torque value that switches from the lower boundary torque value to the upper boundary torque value and back to the lower boundary torque value during a time of a period T. The pulsed torque value is equal to the upper boundary torque value for an amount of time time_high. The pulsed torque is equal to the lower boundary torque value for a time T–time_high. The pulsed torque request (e.g., a signal that moves between two different values without moving to intermediate values between the two values as shown in FIG. 16) may be output to a space vector pulse width modulation motor controller 209 that operates electric machine 126. Space vector pulse width modulator motor controller 209 may be included in inverter system controller 134 or controller 112.

In this example, electric machine 126 is a three phase electric machine that is supplied with electric power via power inverter 224. The amounts of electric current that are supplied in each of the three phases is input to block 226 where Park and Clark transforms convert the electric currents from each of the three phases into a measured torque current $i_q$ and a measured flux current $i_d$. The measured flux current $i_d$ is subtracted from the commanded flux current $i_d$ at junction 214 (e.g., summing junction). The measured torque current $i_q$ is subtracted from the commanded torque current $i_q$ at junction 212 (e.g., summing junction). A pulsed torque request signal is input to current reference generator 210 and current reference generator 210 decomposes the pulsed torque request and outputs a commanded flux current $i_d$ and a commanded torque current $i_q$ to generate the commands that cause electric machine 126 to generate the average of the pulsed torque request, which is equivalent to the driver demand requested torque. Note that the driver demand requested torque may correspond to a torque output of the electric machine, a wheel torque, or an intermediate torque between electric machine torque and wheel torque. If the driver demand torque corresponds to a torque other that output torque of the electric machine, the commanded output torque for the electric machine may be compensated or adjusted for any gear ratio that may exist between the electric machine and the location in the vehicle propulsion system that corresponds to the driver demand torque.

A torque current proportional/integral controller 216 receives a torque current error from junction 212 and outputs a torque voltage $v_q$ command. Similarly, a flux current proportional/integral controller 218 receives a flux current error from junction 214 and outputs a flux voltage $v_d$ command. The torque voltage $v_q$ command and the flux voltage command $v_d$ are processed via an inverse Park transform at block 220 into a torque voltage in a rotating reference frame $v_\alpha$ and a flux voltage in the rotating reference frame $v_\beta$. At block 222, the torque voltage in the rotating reference frame $v_\alpha$ and the flux voltage in the rotating reference frame $v_\beta$ are converted into phase pulses via space vector pulse width modulation. The pulses operate the transistors or switches in the power inverter 224. The power inverter 224 outputs voltages for each of the phase windings of electric machine 126. The position of electric machine 126 is converted into an angle and the angle is supplied to blocks 220 and 226 for the inverse Park transform and the Park and Clark transforms.

Thus, a pulsed torque request may be converted into two electric current commands and the two electric current commands are converted into pulse width modulated pulses. The pulse width modulated pulses control the voltage that is supplied to electric machine 126.

Turning now to FIG. 3, a plot 300 of electric machine losses verses electric machine torque is shown. Plot 300 includes a vertical axis that represents losses of the electric machine and the amount of losses increases in the direction of the vertical axis arrow. The greater the loss value, the lower the electric machine efficiency. The horizontal axis represents torque output of the electric machine and torque output increases in the direction of the horizontal axis arrow. Solid line curve 302 represents losses of an electric machine when a torque request for the electric machine is not pulsed. Dashed line 304 represents losses of the same electric machine when the torque request for the electric machine is pulsed. It may be observed that the torque losses for the electric machine are lower when the torque request is pulsed. Accordingly, there may be benefits to providing a pulsed torque request to an electric drive system.

Turning now to FIG. 4, a plot of how frequency of a pulsed torque request for an electric machine may be adjusted as a function of electric machine speed is shown. Plot 400 includes a vertical axis that represents frequency of a pulsed torque request and the frequency of the pulsed torque request increases in the direction of the vertical axis arrow. The horizontal axis represents electric machine speed and electric machine speed increases in the direction of the horizontal axis arrow. Solid line trace 402 represents viable frequencies in the range of Fmin to Fmax for a pulsed torque request. Fmin corresponds to an electric machine speed $\omega 1$ and Fmax corresponds to an electric machine speed $\omega 2$. Dashed line 404 illustrates an available frequency range for the pulsed torque request.

The torque pulsation technique depends on the ability of the electric drive control system to rapidly drive the electric machine current to near zero before deactivating all switching operations within the inverter. Physical limitations of the system lead to an upper limit of the pulse frequency that is achievable. Additionally, there may be a lower limit to the pulse frequency so that structure-borne vibrations may be avoided. Within these limits there is a range of viable torque pulsation frequencies (e.g., between Fmin and Fmax, where Fmin is the minimum viable torque pulse frequency and Fmax is the maximum viable torque pulse frequency). The choice of these pulsation frequencies can be chosen as a function of motor speed as shown in FIG. 4.

Figures 5, 6:
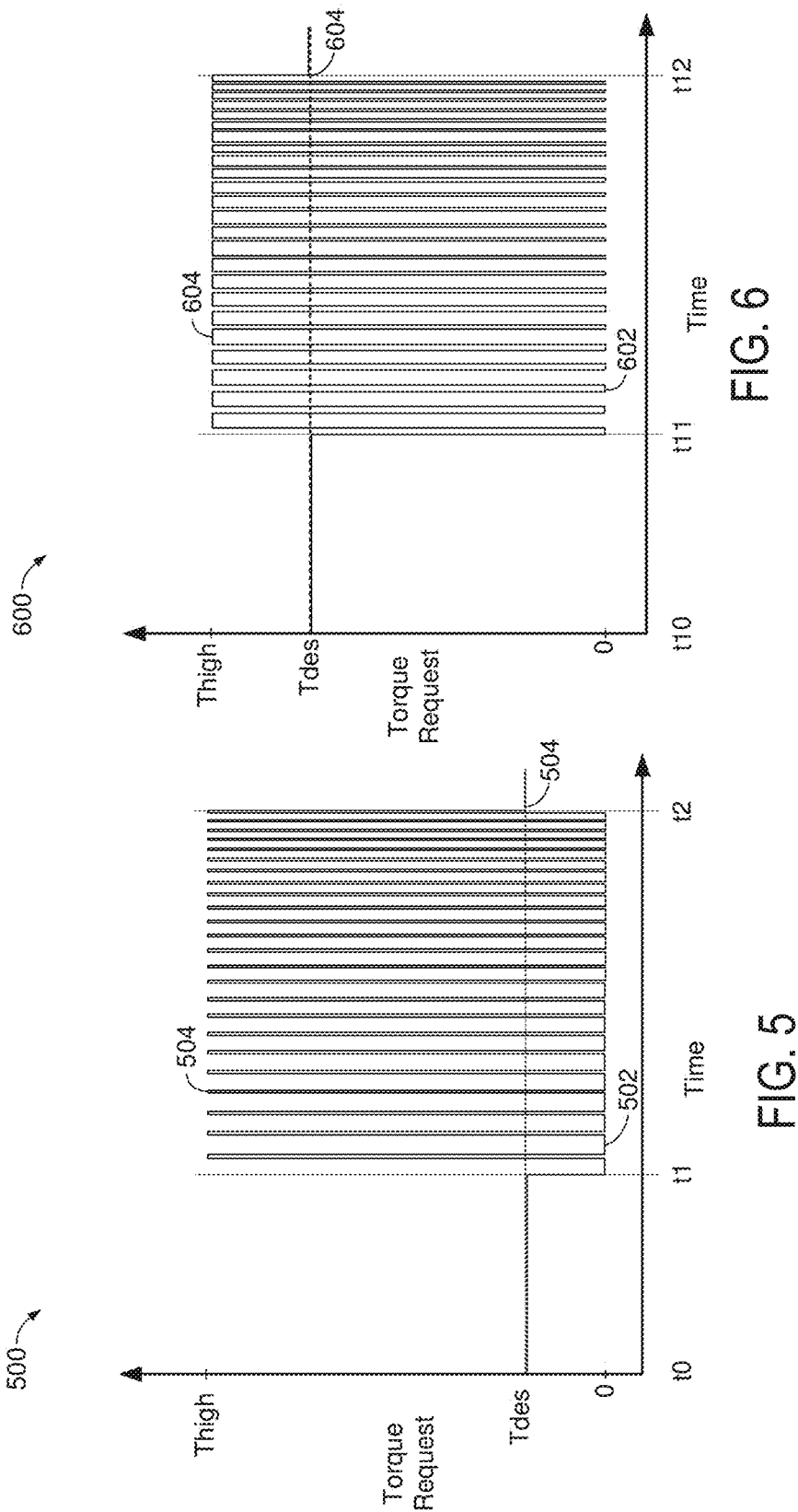
FIGS. 5 and 6 show plots of pulsed torque commands that are varied as a function of electric machine speed to meet a constant driver demand torque.
Figure 7:
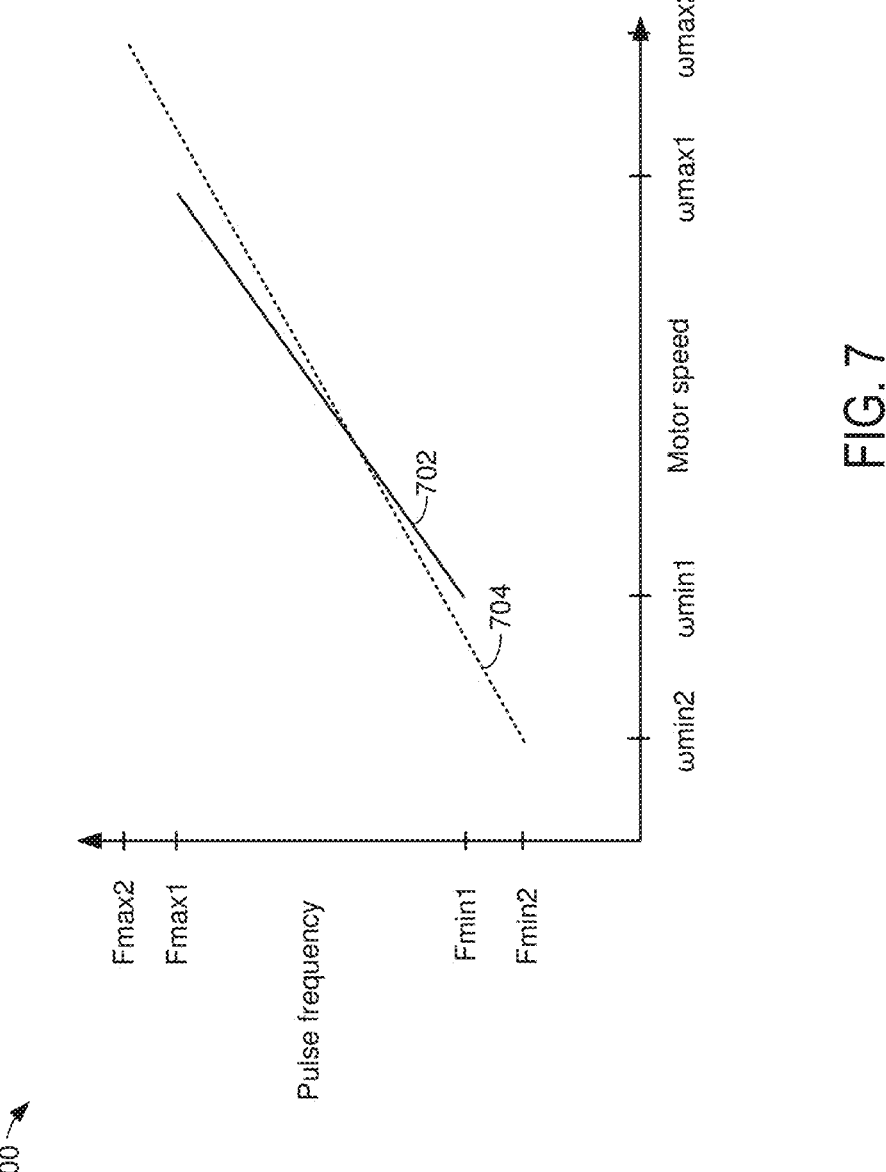
FIGS. 7-14 show plots of ways that pulsed torque commands may be adjusted according to electric machine speed.

Referring now to FIG. 5, a plot 500 of a first example of a pulsed torque request for an electric machine that is generated to lower losses of an electric drive system is shown. The pulsed torque request is generated in response to a constant driver demand torque that is equal to a value Tdes. The vertical axis that represents the torque request value and the torque request value increases in the direction of the vertical axis arrow. The horizontal axis represents time and time increases in the direction of the horizontal axis arrow. Solid line 502 represents the torque request. Note that although solid line 502 extends between the torque values 0 and Thigh, intervening torque values are not included as values in the pulsed torque request. The torque request that is represented by solid line 502 contains only values of zero and Thigh between time t1 and time t2. Solid line 502 extends between these torque values between time t1 and time t2 to aid in following the trace. An example of values used to generate a pulsed torque trace is shown in FIG. 16.

Solid line 502 moves solely between two values, namely, zero and Thigh between time t1 and time t2. The value of Thigh may be adjusted along with the frequency that pulses (e.g., 504) are generated to adjust the average torque (Tdes) that will be generated by the electric machine 126 when the electric machine is commanded to follow the solid line 502. The average torque (Tdes) is equivalent to the driver demand torque (e.g., a constant value in this example), or the driver demand torque that is adjusted based on the corresponding location of the driver demand torque. For example, if the driver demand torque is a wheel torque, the average torque (Tdes) is equivalent to the driver demand torque adjusted for gear ratios between the electric machine and the wheel.

In this example, electric machine speed is gradually increased while driver demand torque is held constant. The pulsed torque frequency is adjusted as the electric machine speed is adjusted between time t1 and time t2. The electric machine speed starts at a lower speed at time t0 and the electric machine gradually increases as time increases. Between time t0 and time t1, the torque request is not pulsed. Rather, the requested torque is equal to the driver demand torque. At time t1, the electric machine reaches a first speed where the torque request begins to be pulsed to improve electric machine efficiency. The frequency of the pulsed torque request is changed as electric machine speed increases. The torque request is no longer pulsed at time t2 when the electric machine reaches an upper speed threshold. The average torque that is requested between time t1 and time t2 is equal to the driver demand torque (Tdes). It may be observed that the amount of time that the solid line 502 is equal to Thigh is short between time t1 and time t2 because the driver demand torque is low.

Referring now to FIG. 6, a plot 600 of a second example of a torque request for an electric machine that is generated to lower losses of an electric drive system is shown. The vertical axis that represents the torque request value and the torque request value increases in the direction of the vertical axis arrow. The horizontal axis represents time and time increases in the direction of the horizontal axis arrow. Solid line 602 represents the torque request. Note that although solid line 602 extends between the torque values 0 and Thigh, intervening torque values are not included as values in the pulsed torque request. The pulsed torque request that is represented by solid line 602 contains only values of zero and Thigh. Solid line 602 extends between these torque values to aid in following the trace.

Solid line 602 moves solely between two values, namely, zero and Thigh between time t11 and time t12. The value of Thigh may be adjusted along with the frequency that pulses (e.g., 604) are generated to adjust the average torque (Tdes) that will be generated by the electric machine 126 when the electric machine is commanded to follow the solid line 602. The average torque (Tdes) is equivalent to the driver demand torque (e.g., a constant value in this example), or the driver demand torque that is adjusted based on the corresponding location of the driver demand torque. In this example, the driver demand torque is greater than the driver demand torque in FIG. 5.

Here, electric machine speed is gradually increased while driver demand torque is held constant. The pulsed torque frequency is adjusted as the electric machine speed is adjusted between time t11 and time t12. The electric machine speed starts at a lower speed at time t10 and the electric machine gradually increases as time increases. Between time t10 and time t11, the torque request is not pulsed. Rather, the requested torque is equal to the driver demand torque. At time t11, the electric machine reaches a first speed where the torque request begins to be pulsed to improve electric machine efficiency. The frequency of the pulsed torque request is changed as electric machine speed increases. The torque request is no longer pulsed at time t12 when the electric machine reaches an upper speed threshold. The average torque that is requested between time t11 and time t12 is equal to the driver demand torque (Tdes). It may be observed that the amount of time that the solid line 602 is equal to Thigh is longer between time t11 and time t12 as compared to similar pulses in FIG. 5 because the driver demand torque is higher.

Referring now to FIGS. 7-10, non-limiting examples of pulsed torque frequency values as a function of electric machine speed are shown. The example relationships in FIGS. 7-10 may be a basis for controlling frequency of a pulsed torque request as a function of electric machine speed. Adjusting frequency of a pulsed torque request may be desirable to control and lower electric drive system losses. The different relationships may permit noise and vibration reduction in different electric machine designs and configurations.

Plot 700 shows two relationships between pulsed torque frequency and electric machine speed. The vertical axis represents frequencies for a pulsed torque request and frequency increases in the direction of the vertical axis arrow. The horizontal axis represents electric machine speed and electric machine speed in the direction of the horizontal axis arrow.

Solid line 702 represents a first relationship between frequency of a pulsed torque request and a speed of an electric machine for a first vehicle operation condition (e.g., a particular driver demand torque). Dashed line 704 represents a second relationship between frequency of a pulsed torque request and a speed of an electric machine for a second vehicle operation condition. It may be observed that for the two operating conditions, there are different minimum pulsed torque frequencies (Fmin1 and Fmin2) and different maximum pulsed torque frequencies (Fmax1 and Fmax2). Additionally, for the two operating conditions, there are different electric machine minimum speeds (ωmin1 and ωmin2) and electric machine maximum speeds (ωmax1 and ωmax2). The relationships also exhibit different slopes (e.g., rates of change in frequency for the pulse torque request with respect to electric machine speed).

Figures 8, 9:
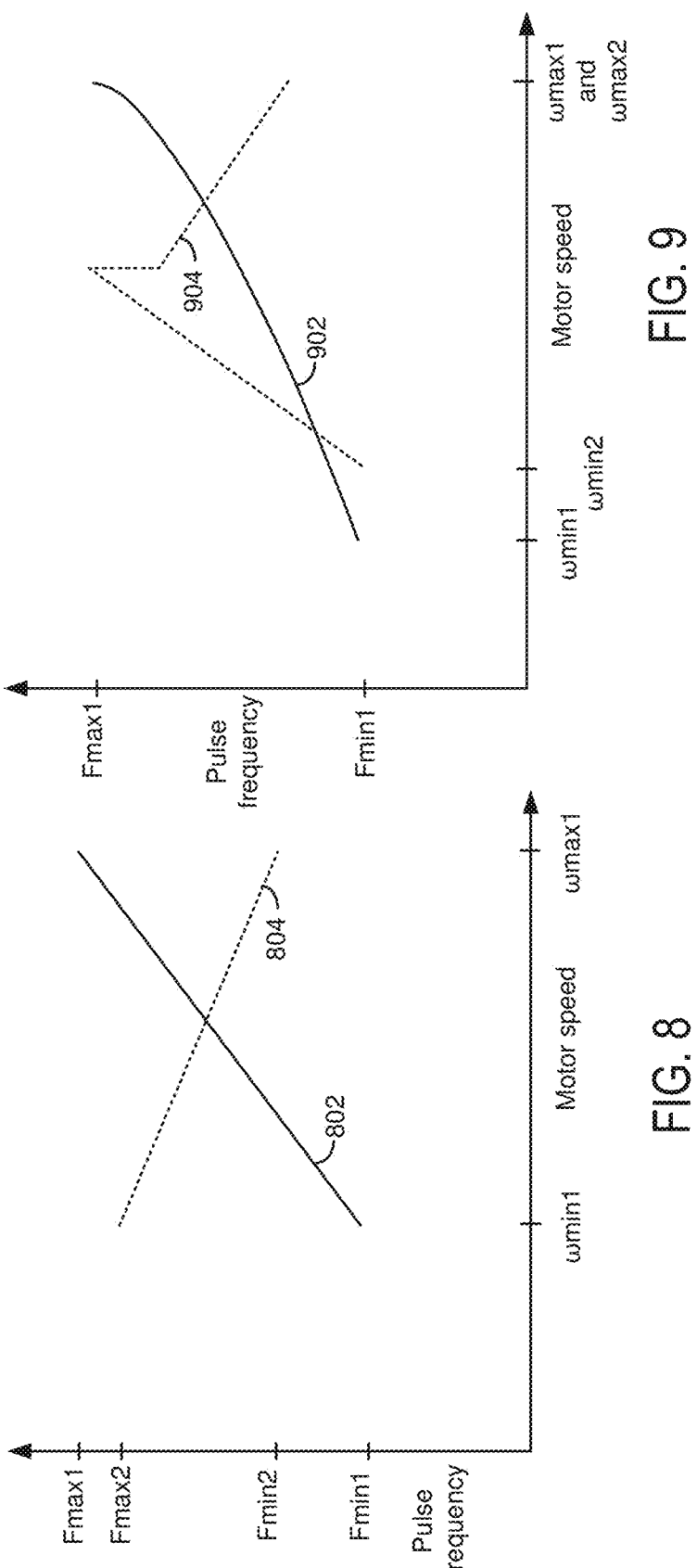

FIG. 8 shows a positive linear relationship between frequency of a pulsed torque request and electric machine speed. FIG. 8 also shows a negative linear relationship between frequency of a pulsed torque request and electric machine speed. The vertical axis represents frequencies of a pulsed torque request and the frequencies increase in the direction of the vertical axis arrow. The horizontal axis represents speeds of an electric machine and the speeds increase in the direction of the horizontal axis arrow.

Solid line 802 illustrates a positive linear relationship between frequency for a pulsed torque request and speed of the electric machine. Dashed line 804 illustrates a negative linear relationship between frequency for a pulsed torque request and speed of the electric machine. In this example, the minimum frequencies and maximum frequencies (e.g., Fmin1, Fmin2, Fmax1, and Fmax2) are different for the two relationships that are indicated by solid line 802 and dashed line 804. The minimum electric machine speed for the pulsed torque request and the maximum electric machine speed for the pulse torque request are equal for each relationship.

FIG. 9 shows a non-linear relationship between frequency of a pulsed torque request and electric machine speed. FIG. 8 also shows a discontinuous relationship between frequency of a pulsed torque request and electric machine speed. The vertical axis represents frequencies of a pulsed torque request and the frequencies increase in the direction of the vertical axis arrow. The horizontal axis represents speeds of an electric machine and the speeds increase in the direction of the horizontal axis arrow.

Solid line 902 illustrates a non-linear relationship between frequency for a pulsed torque request and speed of the electric machine. Dashed line 904 illustrates a discontinuous relationship between frequency for a pulsed torque request and speed of the electric machine. In this example, the minimum frequencies and maximum frequencies (e.g., Fmin1 and Fmax1) are the same for the two relationships that are indicated by solid line 902 and dashed line 904. The minimum electric machine speed (ωmin1 and ωmin2) for the pulsed torque request and the maximum electric machine speed (ωmax1 and ωmax2) for the pulse torque request are different for each relationship.

Figure 10:
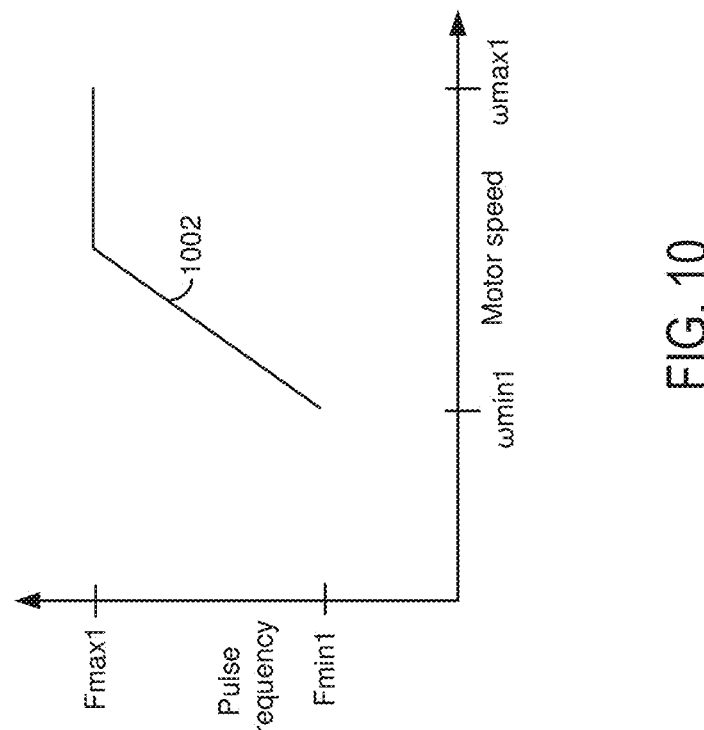

FIG. 10 shows one example of how speed dependent torque pulse frequency may be adjusted within a specific speed range and held constant in a different speed range. This relationship may be applied where the masking noise surface tends to increase at higher electric machine speeds where methods to reduce torque pulsation noise may not be needed. In such cases, the optimization objective may be to revert to focus solely on loss reduction.

The vertical axis represents frequencies of a pulsed torque request and the frequencies increase in the direction of the vertical axis arrow. The horizontal axis represents speeds of an electric machine and the speeds increase in the direction of the horizontal axis arrow. Solid line 1002 illustrates a relationship between frequency for a pulsed torque request and speed of the electric machine. In this example, the minimum frequencies and maximum frequencies are indicated as Fmin1 and Fmax1. The minimum electric machine speed and the maximum electric machine speed are indicated as ωmin1 and ωmax1.

Referring now to FIGS. 11-14, plots show electric machine speed dependent randomizations of torque pulse frequency. The torque pulse frequency may be randomly varied with speed-dependent randomization characteristics. The areas that are enclosed by lines in FIGS. 11-14 represent ranges of frequencies from which the torque pulse frequency may be extracted. Within these ranges, the relative probability distribution of possible frequency values may be a design variable. These randomizations may reduce electric drive losses and noise for different electric drive configurations.

Figures 11, 12, 13, 14:
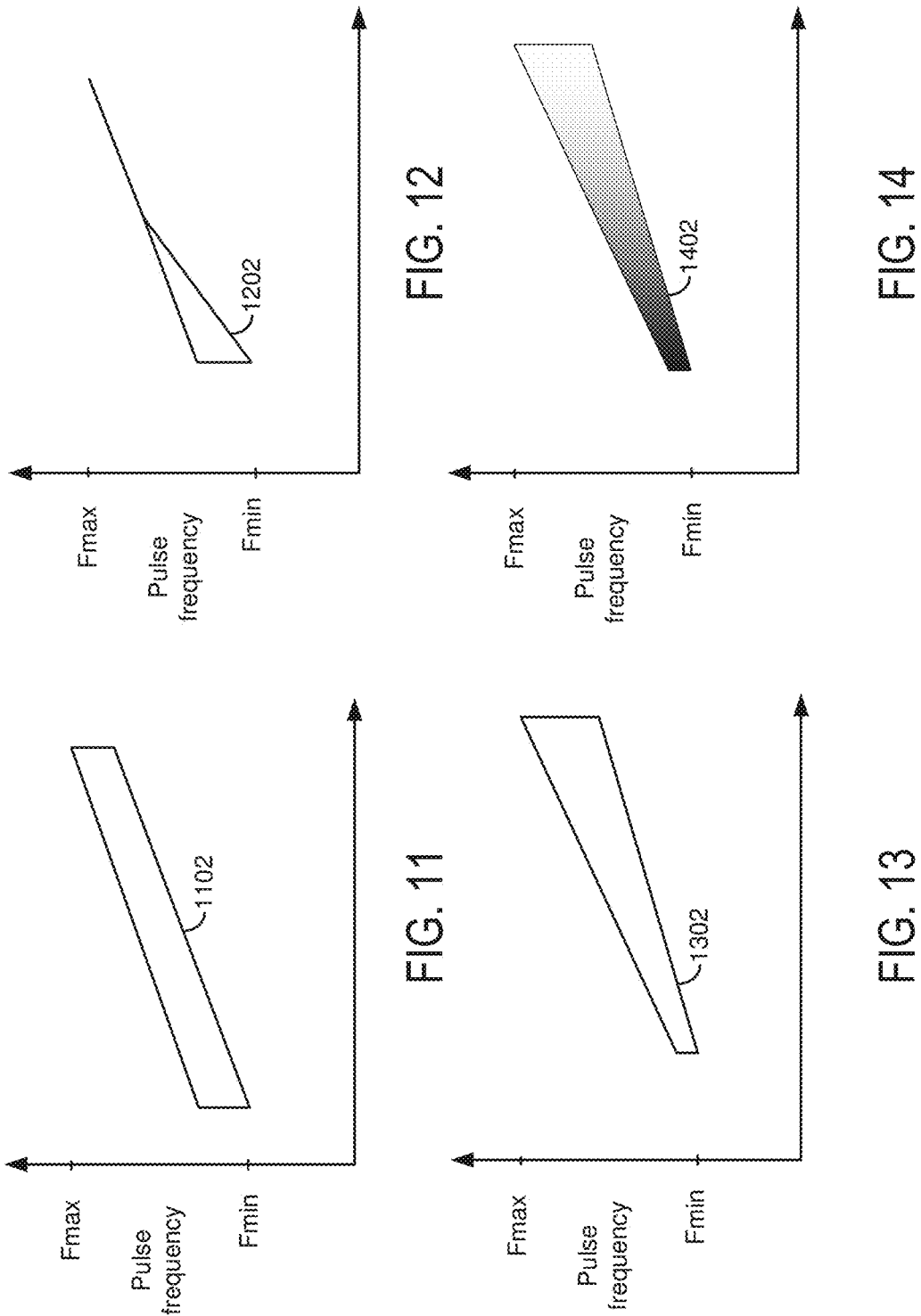

FIG. 11 illustrates a constant frequency width probability distribution. For a given electric machine speed, one of a plurality of torque pulse frequencies may be selected as indicated by the vertical width of the area that is enclosed by line 1102.

FIG. 12 illustrates a piece-wise random/deterministic frequency distribution. For a given electric machine speed at lower electric machine speeds, one of a plurality of torque pulse frequencies may be selected as indicated by the vertical width of the area that is enclosed by line 1202. At higher electric machine speeds, a single pulse torque frequency is provided for each electric machine speed.

FIG. 13 illustrates a speed dependent width probability function distribution. For a given electric machine speed, one of a plurality of torque pulse frequencies may be selected as indicated by the vertical width of the area that is enclosed by line 1302 and the number of frequencies for an electric machine speed increases as electric machine speed increases.

FIG. 14 illustrates speed dependent probability function characteristics. For a given electric machine speed, the characteristics of the probability function may be speed dependent as shown by the area that is enclosed by line 1402.

Referring to FIG. 15, a flowchart of a method for generating a pulsed torque command for an electric machine is shown. The method of FIG. 16 may be at least partially implemented as executable instructions stored in controller memory in the systems of FIG. 1. Further, the method of FIG. 15 may include actions taken in the physical world to transform operating states of the system of FIG. 1. In addition, in some examples, the method of FIG. 15 may be distributed amongst several controllers where each controller performs a portion of the method. Method 1500 may execute when a vehicle is operating at predetermined conditions (e.g., a particular speed and driver demand torque range).

At 1502, method 1500 receives vehicle operating conditions. Vehicle operating conditions may include, but are not limited to vehicle speed and driver demand torque. Driver demand torque may be determined from a position of a driver demand pedal and vehicle speed. Method 1500 proceeds to 1504.

At 1504, method 1500 determines frequencies that are a basis for generating the pulsed torque request or command. In one example, method 1500 references a table or function according to vehicle operating conditions and the table or function outputs frequencies as shown in FIGS. 7-14. The frequencies may be empirically determined by operating an electric machine and adjusting pulsed torque commands to achieve a desired level of electric drive system losses. The frequencies may be bounded or constrained to a range of frequencies via an upper frequency bound and a lower frequency bound. Method 1500 proceeds to 1506.

At 1506, method 1500 converts the driver demand torque request into a pulsed torque request or command. The pulsed torque request is a function of time. In one example, the pulsed torque request is generated via a function that has inputs including driver demand torque request and requested pulsation frequency as output from block 208 of FIG. 2. The pulsed torque request may be generated as previously discussed. Method 1500 proceeds to 1508.

At 1508, method 1500 processes the pulsed torque request into pulse width modulated signals and drives an electric machine via the pulse width modulated signals. The electric machine generates an average torque that is substantially equal to the driver demand torque or the driver demand torque modified according to a location in a driveline where the driver demand torque is requested (e.g., a wheel torque). Method 1500 proceeds to exit.

In this way, method 1500 converts a driver demand request into a pulsed torque request and commands an electric machine to follow the pulsed torque requested. The pulsed torque request may be generated based on one or more frequencies. The frequencies may cause noise and vibrations from an electric drive system to be lowered.

The method of FIG. 15 provides for a method for operating an electric drive system, comprising: generating a pulsed torque request that varies in frequency as a function of electric machine speed in response to a constant driver demand torque request; and generating a torque that on average corresponds to the constant driver demand torque request via an electric machine in response to the pulsed torque request. In a first example, the method includes where the frequency increases as the electric machine speed increases. In a second example that may include the first example, the method includes where the frequency increases linearly as the electric machine speed increases. In a third example that may include one or both of the first and second examples, the method includes where the frequency increases non-linearly as the electric machine speed increases. In a third example that may include one or both of the first and second examples, the method includes where the frequency increases non-linearly as the electric machine speed increases. In a fourth example that may include one or more of the first through third examples, the method includes where the frequency varies discontinuously as a function of electric machine speed. In a fifth example that may include one or more of the first through fourth examples, the method includes where the frequency decreases as the electric machine speed increases. In a sixth example that may include one or more of the first through fifth examples, the method further comprises generating a pulsed torque request that is constant in frequency as the electric machine speed varies. In a seventh example that may include one or more of the first through sixth examples, the method further comprises converting the pulsed torque request into pulse width modulated signals that drive the electric machine.

The method of FIG. 15 also provides for a method for operating an electric drive system, comprising: generating a pulsed torque request that varies in frequency as a function of electric machine speed in response to a constant driver demand torque request, where the pulsed torque request switches between an actual total of two torque values while responding to the constant driver demand torque request; and generating a torque that on average corresponds to the constant driver demand torque request via an electric machine in response to the pulsed torque request. In a first example, the method includes where a first of the two torque values is zero. In a second example that may include the first example, the method includes where a second of the two torque values is greater than the constant driver demand torque request. In a third example that may include one or both of the first and second examples, the method includes where the pulsed torque request is terminated when the electric machine speed is less than a threshold speed. In a fourth example that may include one or more of the first through third examples, the method includes where the pulsed torque request is terminated when the electric machine speed is greater than a threshold speed.

Finally, FIG. 16 shows how an example pulsed torque request may be generated. Plot 1600 includes a vertical axis and a horizontal axis. The vertical axis represents a torque request value (e.g., 0-600 Newton-meters) and the torque request value increases in the direction of the vertical axis arrow. The horizontal axis represents time and time increases from the left side of the figure to the right side of the figure.

In this example, the pulsed torque request is either one of two values. Namely, the pulsed torque request value is zero or Thigh. The average pulsed torque is equal to Tdes, which is equal to a constant driver demand torque that is being requested. The pulsed torque request is comprised of individual values that are indicated via dots that are similar to dot 1602. The line that links the dots as mentioned with regard to traces 504 and 604 in FIGS. 5 and 6 is provided to visually improve the plot, not to indicate that there are any intermediate torque values between 0 and Thigh because there are none. These individual values may be updated at a predetermined rate via the controller to permit generation of a pulse torque request at a desired frequency.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric drive system, comprising:
   generating a pulsed torque request that varies in frequency as a function of electric machine speed in response to a constant driver demand torque request;
   randomly varying a frequency of the pulsed torque request; and
   supply an inverter with pulse width modulated signals that are generated from the pulsed torque request with the randomly varied frequency;
   where randomly varying the frequency of the pulsed torque request includes extracting a torque pulse frequency from a probability distribution; and
   where in the inverter is electrically coupled to the electric machine.

2. The method of claim 1, where the frequency increases as the electric machine speed increases.

3. The method of claim 1, where the frequency increases linearly as the electric machine speed increases.

4. The method of claim 1, where the frequency increases non-linearly as the electric machine speed increases.

5. The method of claim 1, where the frequency varies discontinuously as the function of electric machine speed.

6. The method of claim 1, where the frequency decreases as the electric machine speed increases.

7. The method of claim 1, where the pulsed torque request is constant in frequency as the electric machine speed varies in a speed range.

8. The method of claim 7, further comprising converting the pulsed torque request into pulse width modulated signals that drive the electric machine.

9. A system, comprising:
   an electric drive system including an inverter and an electric machine; and
   a controller including executable instructions stored in non-transitory memory that cause the controller to:
   generate a pulsed torque request;
   randomly vary a frequency of the pulsed torque request; and
   supply the inverter with pulse width modulated signals that are generated from the pulsed torque request with the randomly varied frequency;
   where randomly varying the frequency of the pulsed torque request includes extracting a torque pulse frequency from a probability distribution.

10. The system of claim 9, where the probability distribution is a constant width probability distribution.

11. The system of claim 9, where the pulsed torque request varies in frequency according to a piece-wise random probability distribution.

12. The system of claim 9, where the pulsed torque request varies in frequency according to an electric machine speed dependent probability distribution.

13. The system of claim 9, where the controller further includes executable instructions stored in non-transitory memory that cause the controller to adjust torque generated by the electric machine based on the pulse width modulated signals supplied to the inverter.

14. The system of claim 9, where the electric machine is couple to a wheel of a vehicle.

15. The system of claim 9, where the frequency increases as electric machine speed increases.

* * * * *